(12) United States Patent
Feng et al.

(10) Patent No.: US 8,794,971 B2
(45) Date of Patent: Aug. 5, 2014

(54) METHOD AND SYSTEM FOR ASSIGNING A TASK TO BE PROCESSED BY A CROWDSOURCING PLATFORM

(75) Inventors: Donghui Feng, Fremont, CA (US); Sveva Besana, Los Angeles, CA (US); Clarke Retzer, Van Nuys, CA (US); Micah Winkelspecht, Marina Del Rey, CA (US); Remi Zajac, Pasadena, CA (US)

(73) Assignee: Yellowpages.com LLC, Glendale, CA (US)

( * ) Notice: Subject to any disclaimer, the term of this patent is extended or adjusted under 35 U.S.C. 154(b) by 343 days.

(21) Appl. No.: 12/901,520

(22) Filed: Oct. 9, 2010

(65) Prior Publication Data

US 2012/0088220 A1 Apr. 12, 2012

(51) Int. Cl.
*G09B 19/18* (2006.01)
(52) U.S. Cl.
USPC ............................................ 434/107; 434/108

(58) Field of Classification Search
USPC ................ 434/219, 322–365; 705/7.21–7.26, 705/7.32, 301; 709/224
See application file for complete search history.

(56) References Cited

U.S. PATENT DOCUMENTS

| | | | |
|---|---|---|---|
| 2005/0244799 A1* | 11/2005 | Skenandore | 434/238 |
| 2008/0070223 A1* | 3/2008 | Lofkrantz et al. | 434/350 |
| 2008/0119134 A1* | 5/2008 | Rao | 455/3.05 |
| 2010/0178654 A1* | 7/2010 | Kataoka et al. | 435/6 |
| 2011/0145156 A1* | 6/2011 | Feng et al. | 705/301 |

* cited by examiner

*Primary Examiner* — Timothy A Musselman
(74) *Attorney, Agent, or Firm* — Kilpatrick Townsend & Stockton LLP (57) ABSTRACT

A method and system for applying a task to a crowdsourcing platform for processing are disclosed. For example, a method forwards the task having a question to the crowdsourcing platform, and receives a plurality of answers to the question, wherein the plurality of answers is provided by a plurality of workers associated with the crowdsourcing platform. The method analyzes the plurality of answers on a per-worker basis to determine an adjustment, and applies the adjustment to the plurality of answers.

20 Claims, 6 Drawing Sheets

METHOD AND SYSTEM FOR ASSIGNING A TASK TO BE PROCESSED BY A CROWDSOURCING PLATFORM

The present disclosure relates generally to a method and system for utilizing a crowdsourcing platform to process a task and, more particularly, to a method and system for conducting a post-analysis to evaluate the effectiveness of the answers provided by the crowdsourcing platform and to provide remedial actions, if necessary.

BACKGROUND

A person or a company may have a job that requires completion, but the person or company may not have the requisite knowledge, training, time or workforce to complete the job. Thus, the person or company may submit or outsource the job to another organization or person, such as a subject-matter expert for completion. Alternatively, the job may be outsourced to any one of a number of crowdsourcing platforms for completion by a number of workers associated with the crowdsourcing platform. Broadly, crowdsourcing comprises the outsourcing of a job to a group of people.

However, several common problems are faced by requesters submitting jobs for processing by crowdsourcing platforms. For example, determining an appropriate amount to pay each human worker to complete tasks of the job and how many individual answers (and hence, how many human workers) are necessary to obtain a desired accuracy of the final answer are typical problems faced by a requester submitting a job to a crowdsourcing platform. Furthermore, once the answers are received from a plurality of human workers, it is still difficult to ascertain the accuracy of the answers. For example, there may be significant differences in the human workers' answers across multiple questions. Thus, employing a crowdsourcing platform to process a job continues to present many challenges.

SUMMARY

In one embodiment, the present disclosure discloses a method, a computer readable medium and system for applying a task to a crowdsourcing platform for processing. For example, a method forwards the task having a question to the crowdsourcing platform, and receives a plurality of answers to the question, wherein the plurality of answers is provided by a plurality of workers associated with the crowdsourcing platform. The method analyzes the plurality of answers on a per-worker basis to determine an adjustment, and applies the adjustment to the plurality of answers.

In an alternate embodiment, the method forwards the task having a first question to the crowdsourcing platform, and receives a plurality of answers to the first question, wherein the plurality of answers is provided by a plurality of workers associated with the crowdsourcing platform. The method analyzes the plurality of answers on a per-question basis to determine an adjustment, and applies the adjustment to the first question.

In another alternate embodiment, the method forwards the task having a first question to the crowdsourcing platform, and receives a plurality of answers to the first question, wherein the plurality of answers is provided by a plurality of workers associated with the crowdsourcing platform. The method analyzes the plurality of answers on a per-worker basis to determine a first adjustment, and applies the first adjustment to the plurality of answers. The method further analyzes the plurality of answers on a per-question basis to determine a second adjustment, and applies the second adjustment to the first question.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses methods, systems and computer-readable media for applying a task to a crowdsourcing platform for processing. Although the present disclosure may describe embodiments in the context of particular crowdsourcing environments, the present disclosure is not so limited. Namely, the present disclosure can be applied to any type of computer-based communication network that is capable of supporting crowdsourcing.

Broadly, crowdsourcing comprises the outsourcing of a task to a group of people. In some instances a task may comprise a human intelligence task (HIT), such as answering one or more questions which a computer is generally unable to perform or is inefficient at performing, but which would be more suitable for a human or humans to complete. The present disclosure may sometimes refer to "tasks" and "human intelligence tasks" (HITs). Unless otherwise specified, it is intended that either term comprises a task that is suitable for crowdsourcing, regardless of whether the task is only suitable for performance by humans, or could theoretically be accomplished by a computer or other non-human means.

Some human intelligence tasks (HITS) are suitable for completion by a human workforce as opposed to, for example, a single subject matter expert. For instance, a requester may obtain a correct and accurate answer from an expert with in-depth knowledge of the subject matter, geographic area, etc., but it will cost the requester a significant amount to obtain the knowledge and services of the expert. On the other hand, sufficiently accurate answers to HITs can be obtained by paying non-expert human workers a small fraction of the amount paid to an expert to complete a human intelligence task, while taking the best answer(s) based on the responses from a large number of the non-expert human workers.

Currently, there exist crowdsourcing platforms (such as AMAZON's Mechanical Turk ("MTurk") marketplace) which allow requesters to submit HITs to a human workforce associated with the crowdsourcing platform. For example, a requester can specify various parameters, such as a number of workers it desires to complete a particular HIT and a price that the requester is offering to pay for each completed HIT. The HIT, along with one or more of the various parameters, is advertised to the human workforce by the crowdsourcing platform until the conditions specified in the parameters are met. For example, the price being offered by the requester for the completion of the task, the number of questions in the task, and/or the estimated time to complete the task may be provided. On the other hand, some parameters may not be disclosed to the workforce. For example, a requester may, for whatever reason, choose not to have disclosed the total number of completions of the task that are being requested. Thus, a worker choosing to work on the task may be unaware of how many other workers will have eventually worked on the same task.

However, several common problems are faced by requesters submitting HITs to crowdsourcing platforms. For example, determining an appropriate amount to pay each worker to complete the HIT and how many workers are necessary to obtain a desired accuracy of the answer are typical problems faced by a HIT requester. Solutions for addressing some of the problems faced by HIT requesters are described in co-pending U.S. patent application Ser. No. 12/639,915 by Feng, et al. However, once the answers are received from a plurality of human workers, it is still difficult to ascertain the accuracy of the answers. For example, there may be significant differences in the human workers' answers across multiple questions. Thus, employing a crowdsourcing platform to process a job continues to present many challenges.

Figure 1:
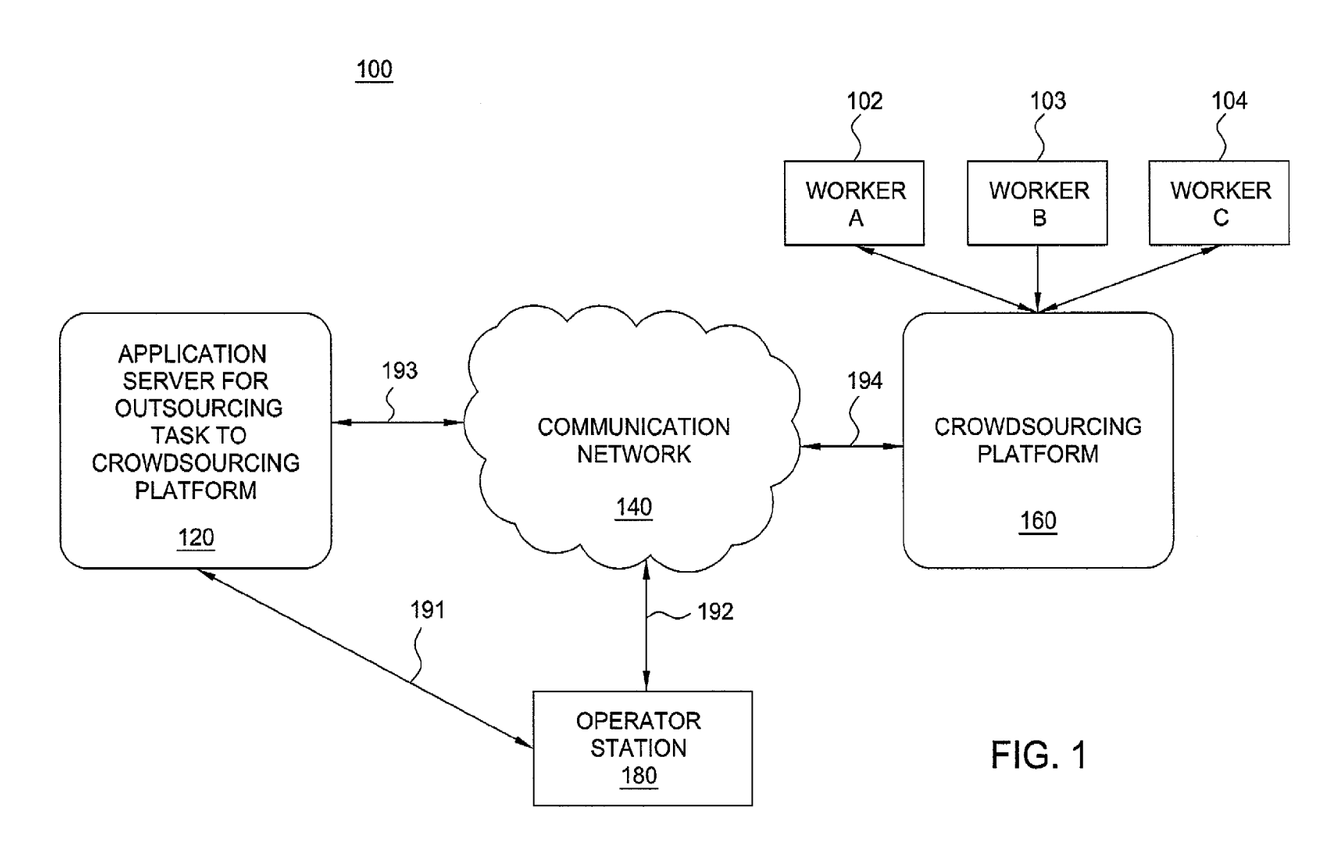
FIG. 1 illustrates an exemplary system related to the present disclosure.

To better understand the present disclosure, FIG. 1 illustrates an example system 100, related to the present disclosure. In particular, an application server 120 may comprise any server or computer that is well known in the art and may be configured to apply a task to a crowdsourcing platform (e.g., a crowdsourcing platform 160) for processing. Communication network 140 may comprise any packet switched or circuit switched network, or any combination of such networks, e.g., Voice over Internet Protocol (VoIP) networks, Service over Internet Protocol (SoIP) networks, Asynchronous Transfer Mode (ATM) networks, Frame Relay networks, and the like. For example, communication network 140 may comprise the internet, one or more access networks, metropolitan area networks (MANs), wide area networks (WANs), local area networks (LANs), wireless networks, and/or core networks to support communications between and among devices connected via the communication network 140.

In one embodiment, an operator station 180 may comprise any type of endpoint device configured for network-based communication, such as a personal computer, laptop computer, personal digital assistant (PDA), mobile phone, email device, messaging device, and the like. As shown in FIG. 1, operator station 180 may directly communicate with application server 120 using communication path 191. Alternatively, operator station 180 may communicate with application server 120 via the communication network 140 using communication paths 192 and 193. It should be understood that communication paths 191, 192 and 193 may comprise any type of wired or wireless physical link that facilitates communication of data and requests between two or more devices.

In one embodiment, crowdsourcing platform 160 may comprise one or more servers, e.g., a web server, configured to provide a crowdsourcing function in accordance with the present disclosure. The crowdsourcing platform 160 may be accessed by requesters, such as a user of the operator station 180 via the application server 120, in order to submit tasks for completion by a workforce associated with the crowdsourcing platform 160. For example, the workforce may comprise a (typically large) number of human workers exemplified by workers A, B and C (102, 103 and 104) depicted in FIG. 1. The workers may independently access the crowdsourcing platform 160 directly (as shown in FIG. 1) or indirectly, such as via communication network 140 and/or one or more other networks.

In one embodiment, a user of the operator station 180 may have a job that requires completion. In addition, the user desires to outsource the job to a crowdsourcing platform. Accordingly, in one embodiment, the user may access application server 120 from the operator station 180 in order to create a job. Broadly, the job may comprise one or more tasks, where each task may have one or more questions and one or more parameters. For example, the user may be an employee of a company attempting to create an accurate address database and may have received raw source data from a number of diverse sources. There may be numerous conflicting entries between the data for the same addresses received from the different sources. For example, the same address may represent the business address for several different business entities, e.g., the different businesses may have operated from the same address at different times. When different raw data sources are combined, such conflict may result due to the fact that some data sources may be more current than other data sources. Thus, a company may desire to integrate the various data sources into a single address database, but the company may have to expend a significant amount of resources to resolve any discrepancies.

One way to accomplish this job is to hire experts or designated employees to review every entry in the raw data and extract information deemed accurate for each address. This could require workers to travel to various addresses, conduct investigations, e.g., making telephone calls to speak with residents, owners and tenants of numerous properties, review various reference sources, and the like. If the raw data is very large, such effort will entail a significant amount of work. On the other hand, a large workforce associated with a crowdsourcing platform may be well suited to perform this large job. Advantageously, hundreds or even thousands of workers each need only perform a small portion of the entire job. In addition, each worker may perform only the relevant portions of the job that are pertinent to the worker. For example, a worker located in New Jersey would not work on a portion of the job (e.g., a task) having to do with addresses in California and vice versa.

In one embodiment, the application server 120 is configured to accept instructions from the user at the operator station 180, or to assist the user in creating a number of tasks that comprise the job. Returning to the above example, the overall job may relate to the creation of a nationwide address database. Thus, the job may be divided into a number of much smaller tasks, each of which can be managed by a worker in a reasonable amount of time. For example, the job may first be narrowed, such as by eliminating all address listings for which the sources are in agreement. Next, the job may be divided into tasks by geographic area (e.g., by state, county, and/or by town). In addition, each task may be limited to ten addresses each. Each address listing may then be considered to be a "question" comprising the task. In this manner, a worker handling a task will only be responsible for ten questions (in this example, addresses) at most.

For example, it may be assumed that ten questions/addresses can be completed in less than 30 minutes, which is deemed to be a reasonable amount of time. Of course, a worker may be free to work on another task that is part of the same job (e.g., another ten addresses) upon completion of the first task. This is just one illustrated example of how a job can be segregated into a number of tasks. The method to determine the requisite number of questions to include in a task, the number of tasks for a job, and other parameters, such as the number of workers to complete each task and the amount to pay each worker to complete the task is further discussed below in connection with the method of FIG. 2.

In one embodiment, the application server 120, assisting the user at operator station 180, or under the instructions of the user, creates a final job that is ready to be submitted to a crowdsourcing platform. The final job may comprise a number of tasks, each task having a number of questions as well as several parameters. Accordingly, the application server 120, upon the instructions of the user at operator terminal 180 may submit the final job to a crowdsourcing platform, e.g., crowdsourcing platform 160. Upon receipt of the job, the crowdsourcing platform may publish the job and/or the specific tasks comprising the job so as to enable the workforce associated with the crowdsourcing platform 160 to access and view details of the job and/or underlying tasks. In one embodiment, the crowdsourcing platform 160 publishes the tasks of the job to a webpage that is accessible to the mobile workforce, exemplified by workers A, B and C (102-104). The webpage may list a number of available tasks based on a number of criteria. For example, all available tasks may be sorted by geographic area, subject matter, amount of compensation being offered, the number of questions per task, the anticipated duration to complete the task, and any other criteria.

By way of example, worker B (103) may notice that a task is requesting the correct address listing for ten addresses in the particular town in which worker B is located. In addition, the compensation being offered is agreeable to worker B for the advertised task. Accordingly, worker B may obtain the necessary materials to complete the task which may be downloaded from crowdsourcing platform 160, or may be obtained from another server, such as from application server 120, or from a location designated by the user at operator station 180. For example, each question may comprise a request to provide a correct address listing for a particular location. Worker B may be presented with several choices as to the correct address listing and be asked to choose the most correct listing. For example, one of the raw data sources may provide a listing "ABC Corp., 100 Route 1, town1, New Jersey 99999." Another source may provide a listing "ABC, 100 Route 1, town2, New Jersey 99999." A third source may provide a listing "ABC Corp., 110 Highway 1, town2, New Jersey 99999." A fourth source may provide a listing "ABC Corp., 100 Route 1, Suite 5, town1, New Jersey 99999." Thus, for this entity listing (comprising one question of a task) the worker is charged with selecting the most correct address from among the possible choices. It should be noted that this illustrated question is only provided as an example. Questions using other formats are within the scope of the present disclosure.

In one embodiment, a number of other workers may select the same task to work on through the webpage of the crowdsourcing platform 160 and provide their answers to the same question. The other workers may all provide the same answer as worker B, or the other workers may all submit a range of other answers. When the requested number of workers has completed the task (or the entire job, including all of its tasks, is completed), the results are provided by the crowdsourcing platform back to the application server 120. The results may then be provided by the application server 120 to the requesting user at operator station 180. However, the results may also be subject to further processing at application server 120, as desired by the requesting user. This further processing is discussed in greater detail below in connection with the method of FIG. 2.

Although the above described components and functions have been referred to with particular terms, it should be understood that the particular terms and embodiments depicted in FIG. 1 and described above are not the only embodiments of the present disclosure. For example, although the network elements comprising the system 100 have been described as one or more discrete devices, it should be appreciated that the functionality described with respect to each network element is not limited to the particular device as described and depicted herein. Rather, the depicted arrangement is merely illustrative of one configuration that is suitable for implementing embodiments of the present disclosure. Thus, any other elements providing the same functionality described herein with respect to the application server 120, communication network 140, crowdsourcing platform 160 and operator station 180 would be equally suitable for use in accordance with embodiments of the present disclosure.

It should be noted that the system 100 may be expanded by including additional endpoint devices, application servers, communication paths, crowdsourcing platforms, etc., without altering the scope of the present disclosure. The foregoing is provided as an illustrative example only. As a further example, application server 120 may be located within communication network 140. Accordingly, in one embodiment the application server 120 for outsourcing tasks to a crowdsourcing platform may be provided as a resource by a telecommunications network services provider (e.g., to its subscribers using one or more operating stations including operating station 180). In still another embodiment, the system 100 may include two or more operator stations, which may be collocated or geographically dispersed, for communicating with application server 120. In addition, application server 120 may comprise a single integrated or stand-alone application server or one or more server resources which are together configured to perform the outsourcing of tasks to a crowdsourcing platform. Additionally, multiple application servers for outsourcing tasks to crowdsourcing platforms may be available to the operator station 180 via the communication network 140 and may or may not be controlled by the same entity.

Furthermore, two or more crowdsourcing platforms may be available to requesters and/or the application server 120 for handling submitted tasks. Accordingly, a requester at operator station 180 may choose between crowdsourcing platform 160 and another crowdsourcing platform, and request that application server 120 outsource a task to the crowdsourcing platform that is selected by the user. Alternatively, the application server 120 may choose between two or more equally capable and available crowdsourcing platforms on behalf of the user. For example, the application server 120 may choose a particular crowdsourcing platform based on the best cost, a number of available workers, or a completion time guaranteed by the crowdsourcing platform. In addition, the two or more crowdsourcing platforms may be controlled by different entities. Thus, although only one crowdsourcing platform 160 is depicted in FIG. 1, the present disclosure is not so limited. It should be noted that other components and the terminology used to refer to such components may be used interchangeably with those depicted and described in connection with FIG. 1, depending upon the context and/or the particular network.

Figure 2:
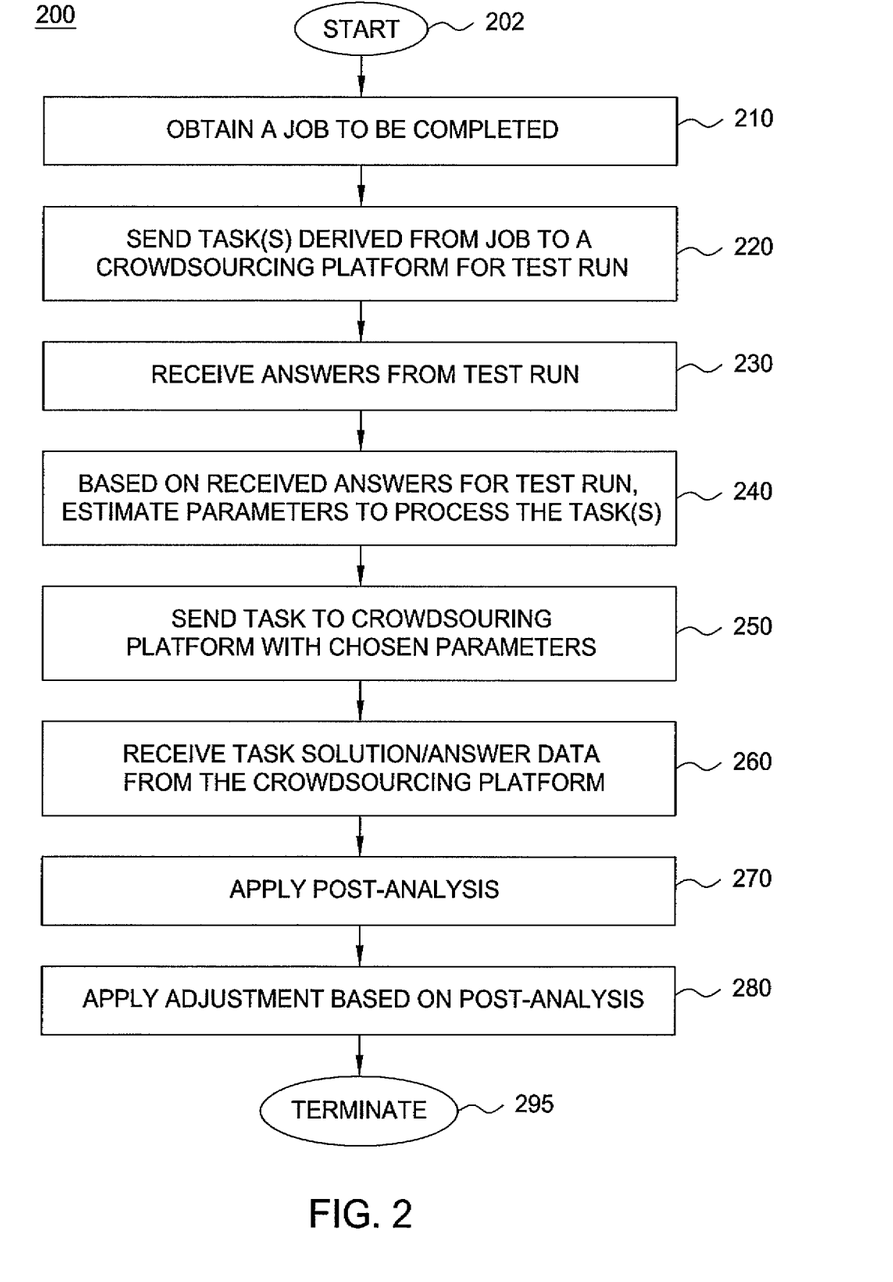
FIG. 2 illustrates a flowchart of a method for applying a task to a crowdsourcing platform for processing.

FIG. 2 illustrates a flowchart of a method 200 for outsourcing one or more tasks to a crowdsourcing platform for completion. The steps of the method 200 may be performed by any one or more of the components of the system 100 depicted in FIG. 1. For example, one or more steps of the method 200 may be implemented by the application server 120. Alternatively, or in addition, one or more steps of the method 200 may be implemented by a general purpose computer having a processor, a memory and input/output devices as illustrated below in FIG. 6. Although any one of the elements in system 100 may either singly, or in conjunction with any one or more of the other elements, be configured to perform various steps of the method 200, for illustrative purposes, the method will now be described in terms of an embodiment where steps of the method are performed at an application server.

The method 200 begins in step 202 and proceeds to step 210. At step 210, the method obtains a job to be completed. For example, a requester (e.g., a user of operator station 180) may be attempting to create an accurate address database and may have received raw source data from a number of diverse sources. There may be numerous conflicting entries among the data sources for the same addresses. Thus, the requester may desire to integrate the data into a single, accurate address database. In addition, the requester may determine that this project is suitable for submission as a crowdsourcing job. Accordingly, the method 200 may receive this project as a job submission from the requester at step 210.

At step 220, the method 200 divides the job into one or more tasks and sends the one or more tasks to a crowdsourcing platform for a test run. In particular, since a job of this nature may be very large, it may be desirable to sub-divide the job into a (potentially large) number of smaller tasks. For example, each address listing may be considered a single question (e.g., "what is the correct listing for this address?") Each of the tasks may then be assigned a number of questions. For example, each task may contain ten questions (e.g., ten address listings to be verified). However, since the entire job may be massive, such as in the case of a national address database, it may be desirable to first determine an ideal number of questions per task, prior to submitting the entire job to a crowdsourcing workforce. In addition, it may be desirable to determine other ideal parameters for submitting the entire job, and the tasks comprising the job, for crowdsourcing.

Accordingly, in one embodiment, the method 200 submits one or more of the tasks as test tasks to a crowdsourcing platform, such as crowdsourcing platform 160, for completion. The test tasks may have various parameters. For example, one test task may include ten questions, offer $1.00 for completion, and request 50 workers to complete the task. Another test task may include 20 questions, offer $1.50 for completion, and request 25 workers to complete the task. In one embodiment, several test tasks with different ranges for various parameters are submitted to the crowdsourcing platform for a test run.

At step 230, the method 200 receives the results of the test run. For example, the results may comprise data conveying such information as a count of the number of workers answering each question of a test task a particular way. For instance, a question may present a worker with several choices as to one address listing and the user may be asked to choose the most correct listing. For example, one source may provide a listing "ABC Corp., 100 Route 1, town1, New Jersey 99999" (Choice A). Another source may provide a listing "ABC, 100 Route 1, town1, New Jersey 99999" (Choice B). A third source may provide a listing "ABC Corp., 100 Highway 1, town2, New Jersey 99999" (Choice C). A fourth source may provide a listing "ABC Corp., 100 Route 1, Suite 5, town2, New Jersey 99999" (Choice D). Thus, for this one address listing (comprising one question of a task) a worker is charged with selecting the most correct address from among the possible choices. Although this scenario presents an example of a multiple choice question, the present disclosure is not so limited. For example, a question suitable for crowdsourcing may also comprise an open ended question, such as "what is the correct address listing for "ABC Corp." in New Jersey?" without providing any particular choices to the worker.

Returning to the present example, if the above question is part of a test task with a parameter specifying that 20 workers complete the task, it may be found that 16 workers selected Choice C, 3 workers selected Choice A, 1 worker selected Choice D, and none selected Choice B as the correct answer. Thus, (since the majority of workers answered Choice C) the results data may indicate that Choice C is the most correct answer. Alternatively, or in addition, the results data may simply indicate the distribution of answers, and may further store indications of which particular workers provided which answers to the question. Similar data may be collected for each of the questions comprising the test task. The results data for the entire test task may be received by the method 200 from the crowdsourcing platform, e.g., crowdsourcing platform 160.

At step 240, the method 200 estimates parameters to process tasks of the full job. For example, the results of a test run may be analyzed by the method 200 to extract an optimal set of parameters to use for submission of the full job (including its composite tasks) for crowdsourcing. The method may, for instance, determine that the best and most cost-effective results are obtained when the job is divided into tasks comprising ten questions, each task requiring 50 workers to complete the task, and compensation should be provided at $1.25 per task. In one embodiment, the method may determine the ideal parameters based at least in part on a set of preferences defined by the requester. For example, the requester submitting the job may set a maximum budget of $10,000, may set a due date for receiving the results at four weeks, and may express a preference for accuracy over cost savings (within the maximum budget of $10,000). Based on the test run data, the method 200 may determine the set of parameters that most closely matches the requester's preferences. For example, the method 200 may automatically execute a computer-implemented algorithm to perform the matching of parameters extracted from the results data of the test run to the requester's preferences.

As part of the process of estimating the ideal parameters, the method 200 may compare the results of one test task to several others in order to reach a conclusion. For example, the test run results data may indicate that increasing the accuracy is obtained by increasing the compensation up to $1.25, but that little or no increased accuracy is further obtained in escalating payments to $1.50. This trend may be extrapolated from observing the results data pertaining to all or several of the test tasks having different compensation values as the parameters. On the other hand, the method 200 may determine that increasing payments to $1.50 would result in an increased speed in obtaining the completed tasks. In addition, the method 200 may determine that an increased accuracy may result by increasing the number of workers completing each task up to 100 workers. Based on determinations such as these, the method 200 estimates the ideal parameters for submission of the tasks of the full job to the crowdsourcing platform while meeting the constraints set by the user.

As described above, the estimated accuracy of the answers is an important metric and can be used in determining further parameters for completion of the full job. In one embodiment, the accuracy of the answers is determined by an entropy measure which indicates how well correlated the answers are to a particular question. For example, if 85 out of 100 workers provide the same answer to a question, the answers may be considered well-correlated and the question has a low entropy. On the other hand, if 30 workers provide the same one answer, 20 workers provide the same second answer, 25 workers provide the same third answer, and the rest of the remaining 100 workers provide a range of other answers, the answers may be considered not well-correlated and thus, the question may be considered as having a high entropy. In one embodiment, the requester will be looking for low entropy answers to questions. Accordingly, in one embodiment, the method 200 attempts to select parameters which minimize the entropy of the resulting answers. It should be noted that the desire to minimize the entropy of the resulting answers in choosing the submission parameters is balanced with competing constraints and goals such as a maximum budget and the requested timeframe for completion, as described above. Thus, the method 200 may employ any parameters selection algorithm that accounts for any one or more of the above discussed parameters, and other factors, in order to choose ideal parameters for submission of a full job for crowdsourcing.

At step 250, the method 200 submits at least one task of the full job to the crowdsourcing platform for processing with the parameters determined in step 240. In one embodiment, the entire job, and all of its composite tasks are submitted for crowdsourcing. However, for simplicity and for present purposes, only one task of the job will be described. Thus, it should be understood that potentially many other similar tasks comprising the entire job may be submitted for crowdsourcing in parallel with the single task described in the exemplary scenario.

The submitted task may, for example, comprise ten questions and have the following parameters: 50 workers are requested to complete the task, compensation is provided at $1.25 per task. The parameters are determined by the process described above at step 240. Although only two parameters are mentioned in this example, it should be noted that additional and different parameters, such as restricting workers to a geographic area and so on, may also be specified by the method 200 in submitting the task. Additional parameters may be automatically determined by the method 200 (e.g., using substantially the same process described above at step 240), or may be user-specified constraints (e.g., made by the requester). Such additional parameters could, for example, comprise geographic restrictions, age restrictions, and the like. Thus, the present example is provided for illustrative purposes only and the present disclosure is not so limited.

At step 260, the method 200 receives results data comprising answers (e.g., solutions) to the questions comprising the submitted task. The results data may be similar in scope to the test run results obtained from the crowdsourcing platform at step 230. For example, the results data may include an indication of the most correct answer to each question. Alternatively, or in addition, the results data may simply indicate the distribution of answers. The results data may further store indications of which particular workers provided which answers. In addition, similar data may be collected for each of the questions comprising a single task and the results data for the entire task may be received by the method 200 from the crowdsourcing platform.

At step 270, the method 200 performs a post-analysis on the received results. In one embodiment, the received results are analyzed on a per-worker basis. For example, the answers provided by a particular worker to various questions are tracked. With respect to each answer provided by the worker, it is noted whether or not the worker's answer agrees with the majority of the answers to the associated question. If, based on an analysis of the worker over a number of questions, it is determined that the worker consistently fails to provide answers that correlate to the majority (i.e., likely the correct answer), this circumstance will be noted. In addition, various remedial actions may be taken at step 280, as described further below and in connection with FIG. 4. The foregoing is just one example of a post-analysis performed on a per-worker basis. Further examples, and a more detailed discussion of a per-worker, or worker-centric, post-analysis is provided below in connection with the description of FIG. 4.

In another embodiment, the received results are analyzed on a per-question basis. For example, the method 200 may determine from the results data as to how well-correlated the answers to a particular question are. Answers to a question that are not-well correlated (high-entropy) may be indicative of a poorly crafted question. For example, a question may be a multiple choice question and provide five choices of possible answers. If 100 workers attempt to answer the question, and the results indicate that the answers are nearly evenly distributed among the possible five choices, then it is possible that the question itself is unclear or ambiguous. In other words, a high entropy may be indicative of the workers having trouble with understanding the question. In addition, various remedial actions may be taken at step 280, as described further below and in connection with FIG. 5. The foregoing is just one example of a post-analysis performed on a per-question basis. Further examples, and a more detailed discussion of a per-question, or question-centric, post-analysis is provided below in connection with the description of FIG. 5.

At step 280, the method 200 applies an adjustment to the received results based on the post-analysis of step 270. As an example, in the case where a worker-centric post-analysis determines that 50 percent of a worker's answers diverge from the majority of the answers for various questions, the worker may be suspected of failing to properly perform the task. For example, the worker may be simply selecting random answers to complete the task and obtain payment for completing the task. Similarly, the worker may have recently moved to a new area and therefore may technically comply with the geographic parameters specified for the task, but the worker is actually not competent to process the task as it requires some knowledge of the local area. Accordingly, one adjustment (e.g., a remedial action) that may be applied by the method 200 is to withhold payment from the worker. Another adjustment may be to discard or exclude all of the answers provided by the suspect worker from the results data. With respect to a question-centric post-analysis, if the method 200 determines that the answers to a question are not well-correlated (high-entropy), the entire question may be excluded from the results data. The foregoing are just a few example of adjustments that may be applied based on a post-analysis of task results data obtained from a crowdsourcing platform. Further examples of adjustments and remedial actions based on a post-analysis are provided below in connection with the description of FIGS. 4 and 5. In any event, after one or more adjustments based on the post-analysis are made, the results data may be provided to the requester submitting the original job. At step 295, the method terminates.

Figure 3:
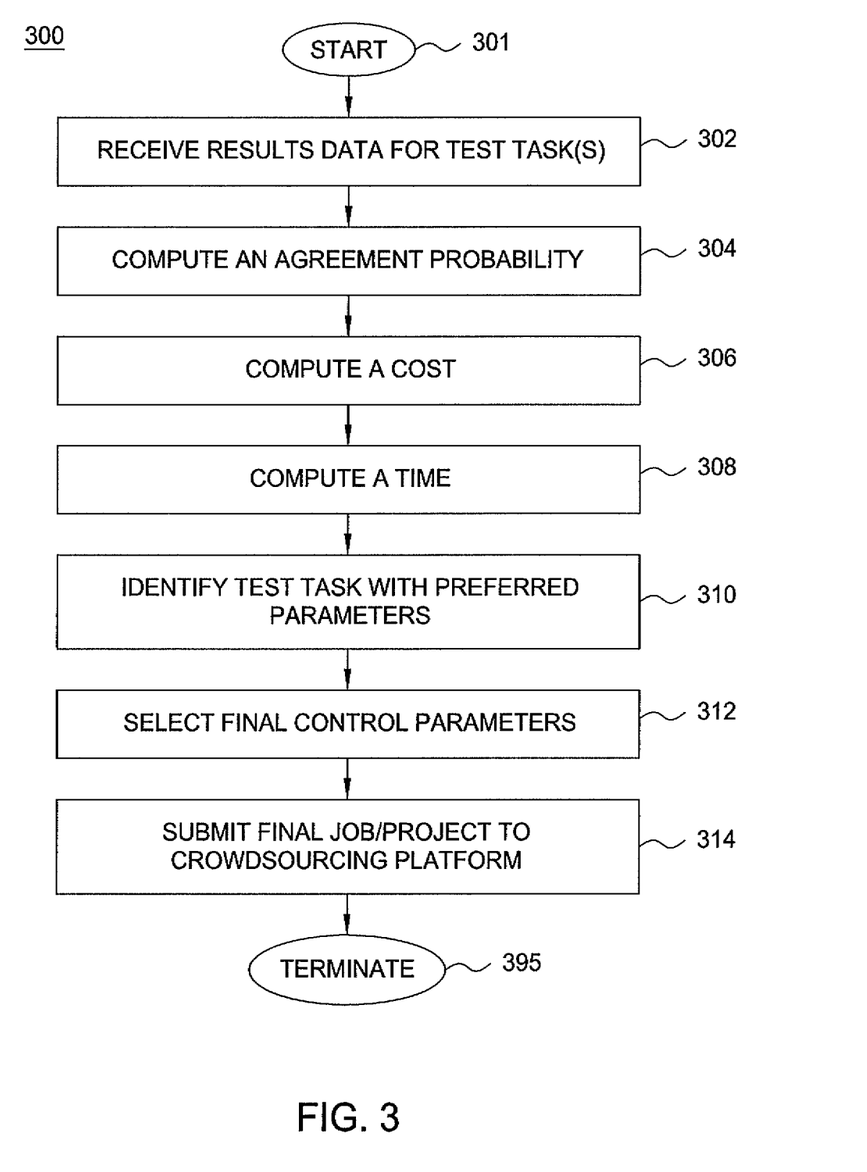
FIG. 3 illustrates a more detailed flowchart of a method for applying a task to a crowdsourcing platform for processing.

FIG. 3 illustrates a detailed flowchart of steps of a method for applying a task to a crowdsourcing platform for processing. In particular, the steps of the method 300 may overlap or supplement one or more of steps of the method 200, and similarly may be performed by any one or more of the components of the system 100, depicted in FIG. 1. For example, one or more steps of the method 300 may be implemented in whole or in part by application server 120.

The method 300 begins in step 301 and proceeds to step 302. At step 302 the method 300 receives results data for test tasks submitted to a crowdsourcing platform, such as crowdsourcing platform 160. In one embodiment, each of the test tasks has one or more questions and has values for the following two validation control parameters: a payment per task and a number of solutions per task (i.e., a number of workers to complete the same task). The values are selected by the requester or by other means, such as by application server 120 in FIG. 1. Each test task has a different combination of values for the two validation control parameters. The workers of the crowdsourcing platform, such as workers A-C (102-104) of crowdsourcing platform 160 in FIG. 1, provide solutions to the test tasks which are incorporated in to the results data for the test tasks.

At step 304, the method 300 computes an agreement probability of each test task based on the received results. The agreement probability is a percentage of solutions/answers for questions of a given task that match reference solutions/answers. According to one embodiment, reference solutions are solutions or answers provided by experts or by other online non-experts. The agreement probability is thus the percentage of answers that are the same as the answers provided by an expert or by other online non-experts (e.g., by a majority of workers answering a particular question).

At step 306, the method 300 computes a cost for each test task based on the received results. The cost is the cost that each test task requires to complete.

At step 308, the method 300 computes a time to complete each test task based on the received results. The time is the time required for each test task to be completed by the requested number of workers.

At step 310, once agreement probabilities, costs, and times are computed for each test task, the method 300 selects a test task with optimized parameters based on a lowest cost, a lowest time, and a highest quality (e.g., the highest agreement probability). In other words an algorithm or equation is used to identify which test task has a preferred combination of cost, time and quality. By preferred it is meant that the requester indicates different levels of importance as to cost, time, and quality, and the algorithm or equation computes a value for each test task that represents the success of each test task meeting the requester's levels of importance. For instance, the results data associated with the selected test task may not have the highest quality as compared to the other test tasks, yet in combination with a cost and time that are low enough, the selected test task can still be identified as having the preferred parameters.

At step 312, having identified the test task with the preferred parameters, the method 300 selects two final control parameters (e.g., the cost and number of workers to complete the task derived from the identified test task having preferred parameters) for submitting the final job or project to the crowdsourcing platform.

At step 314, the method 300 submits a final job/project to an online crowdsourcing system. The final project includes tasks which specify the two final control parameters. It should be noted that in the example of method 300, only two control parameters are described. However, the present disclosure is not so limited. For example, additional and different parameters may also be specified with respect to a task submitted to a crowdsourcing platform. For example, the method 300 may determine an ideal geographic range for matching workers to tasks having a geographic component. This additional parameter may be determined in much the same way as the ideal cost and number of workers to perform a task are determined, as described above. For instance, test tasks may have varying geographic constrains which limit the potential workers who can work on the test task to those located in a particular town, a particular county or a particular state. Alternatively, the test tasks may specify that only workers a particular mileage or other distance range from a particular location can work on a specific task. In yet another embodiment, the method 300 may specify automatically, or by user request, an age restriction on potential workers. Thus, steps 304-312 of method 300 can be perceived as one illustrative method of performing step 240 as discussed in FIG. 2. At step 395, the method 300 terminates.

Figure 4:
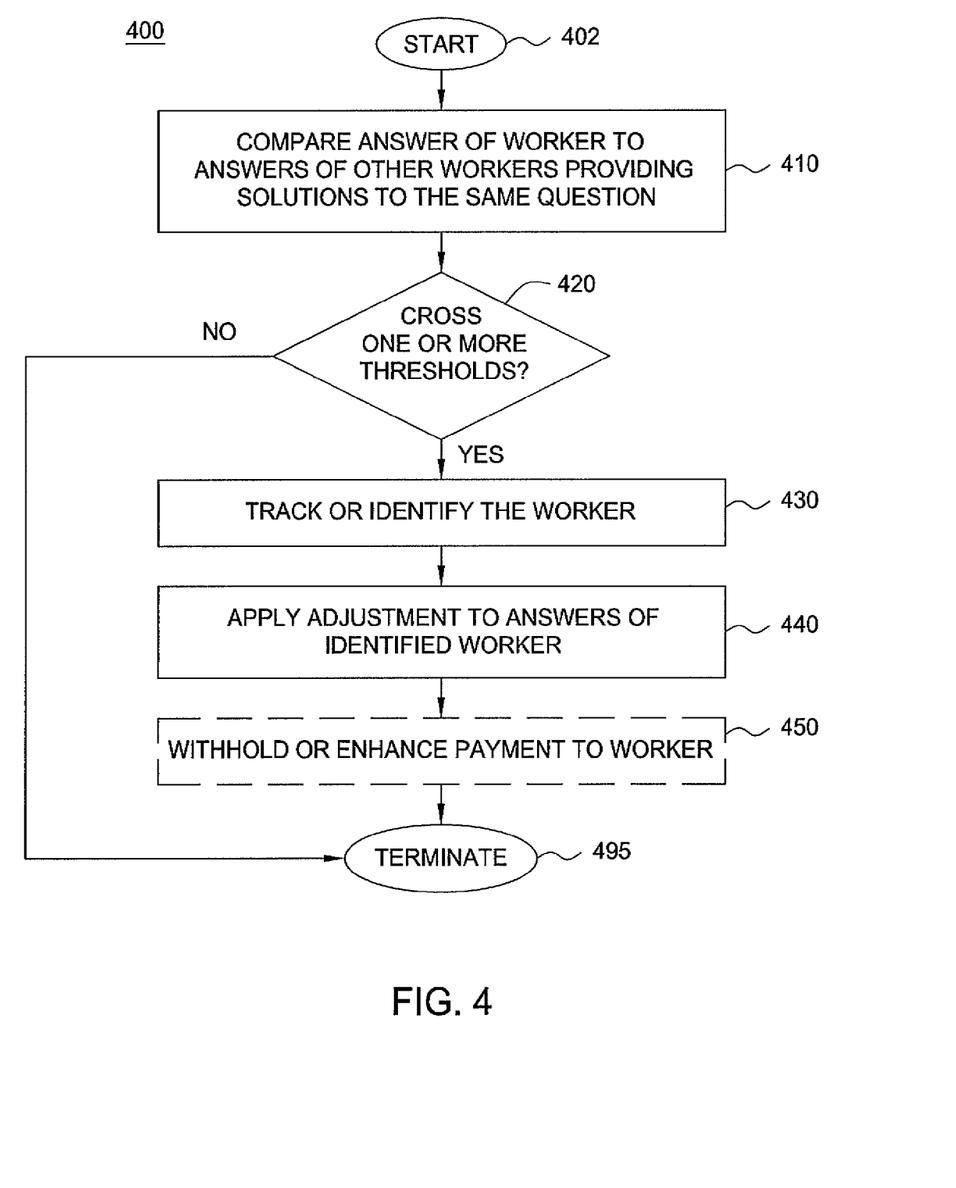
FIG. 4 illustrates a more detailed flowchart of a method for applying a task to a crowdsourcing platform for processing including analyzing answers on a per-worker basis.

FIG. 4 illustrates a flowchart of a method 400 for performing a worker-centric post-analysis on results data obtained from a crowdsourcing system. The steps of the method 400 may comprise, for example, steps 270 and 280 of FIG. 2. In addition, the steps of the method 400 may be performed by any one or more of the components of the system 100 depicted in FIG. 1, including application server 120. Worker-centric post-analysis broadly encompasses the analyzing of results data on a per-worker basis (i.e., to extract characteristics from the results data that are specific to a particular worker and that are indicative of that particular worker's work product and/or work quality). Examples of characteristics that may be analyzed on an individual/per-worker basis are described below in connection with the exemplary method 400.

The method 400 begins in step 402 and proceeds to step 410. At step 410, the method 400 compares the answer of a worker to the answers that other workers provided for the same question. It is assumed that the method 400 has previously received a set of results data from a crowdsourcing platform. An example of receiving the results data is described above in connection with step 260 in FIG. 2. After receiving the results data, the method 400 may select a first worker to be analyzed from among a number of workers completing a task. The method 400 may access the results data pertaining to a first question of the task and determine whether or not the answer provided by the first worker is in agreement with the likely "correct" answer (e.g., the answer selected by the majority of workers answering the question). The method 400 may then create or update a data record storing an indication as to whether the first worker's answer matches the correct answer. Furthermore, the method 400 may perform this type of analysis over a number of questions comprising the task and even over a larger number of questions comprising several tasks which the first worker has completed. Accordingly, the method 400 may store a raw count or a composite "score" for the first worker indicative of how many answers, and what percentage of answers provided by the first worker, match the correct answers for the various questions. For example, the score may comprise a ratio of the number of correct answers to the total number of answers provided by the first user.

At step 420, the method 400 determines if one or more worker-centric thresholds are crossed. For example, the method 400 may determine that the first worker's answer to a question does not match the "correct" answer, where the threshold for the "correct" answer for a question is an answer provided by at least 75% of the total workers. In other words, the method is applying an analysis that is based on a consensus of an answer of a particular worker as compared to answers of other workers who are performing the same task.

In another example, the method 400 may determine that out of the 20 questions, the first worker's answers did not match the number of "correct" answers to meet the minimum threshold of 15 correct answers, and so on. Workers failing to meet the minimum thresholds will be subjected to a penalty as discussed below. As such, any number of "minimum" thresholds can be selected.

In another embodiment, the method may determine that a worker's agreement ratio, or "score" (i.e., the percentage of answers provided by the user that match the correct answers), is higher than a predetermined "maximum" threshold. For example, the method 400 may have established a threshold that dictates that any user answering more than 50 questions and having an agreement ratio greater than 95% is subject to an enhancement as discussed below. In other words, "minimum" and "maximum" thresholds can be selectively set. The worker's identity is tracked based on the worker's performance in step 430.

At step 440, the method 400 may apply an adjustment (e.g., a penalty or enhancement) to the worker or the answers of the worker. For example, the answers of the first worker may be weighted based on the outcome of step 420. In one embodiment, the adjusting comprises downgrading answers of the worker if the worker's "score" is below a threshold for downgrading. In other words, the downgrading comprises dropping or excluding answers of the worker from the results data. In another embodiment, the downgrading may comprise lower weighting of the answers of the worker. For example, the answer of the downgraded worker may be multiplied by 0.5, 0.7 or some other factor, such that the answer is treated with less significance than a standard answer (e.g., when aggregated to produce results data). On the other hand, the method 400 may infer that workers with high agreement ratios are reliable workers and that their answers should be given even greater weight. Thus, the method 400 may apply an enhancement factor to the answers of a worker crossing a threshold for high agreement ratios, e.g., by multiplying the answers with a weight of 1.2 or 1.5, such that the answer is treated with more significance than a standard answer.

Although only two thresholds are described, it should be noted that numerous additional thresholds may be implemented as an alternative or in addition to those described above. For example, a worker with an agreement ratio below 50 percent may have answers to questions downgraded by applying a multiplier of 0.5 and workers with an agreement ratio below 20% may have answers to questions downgraded by multiplier of 0 (effectively eliminating the worker's answers completely) and so on.

At step 450, the method 400 may apply a payment modifier (broadly applying a payment adjustment) to the worker. For example, the method 400 may optionally determine to withhold payment to low scoring workers and/or to enhance payments to high scoring workers as an incentive to encourage quality work product. These modifiers may be established by agreement with the crowdsourcing platform, such that the method 400 may send payment modification terms to the crowdsourcing platform. The crowdsourcing platform may, in turn, apply the modification terms to the payments scheduled to be made to its workers per the task parameters. The payment modifiers may be triggered by the crossing of one or more thresholds which may or may not be the same thresholds used to determine adjustments to be made to a worker's answers.

In one embodiment, workers associated with the crowdsourcing platform are assigned persistent reputation ratings which stay with the worker from task to task. Accordingly, the workers have a constant incentive to produce high-quality work in order to not lose a high reputation rating. In one embodiment, if the method 400 determines that a threshold is crossed, the method 400 may indicate (e.g., to the crowdsourcing platform) that the worker's reputation rating should be increased or decreased depending upon which threshold is invoked.

After payment modifiers, if any, are determined and applied at step 450, the method 400 proceeds to step 495 where the method terminates.

Figure 5:
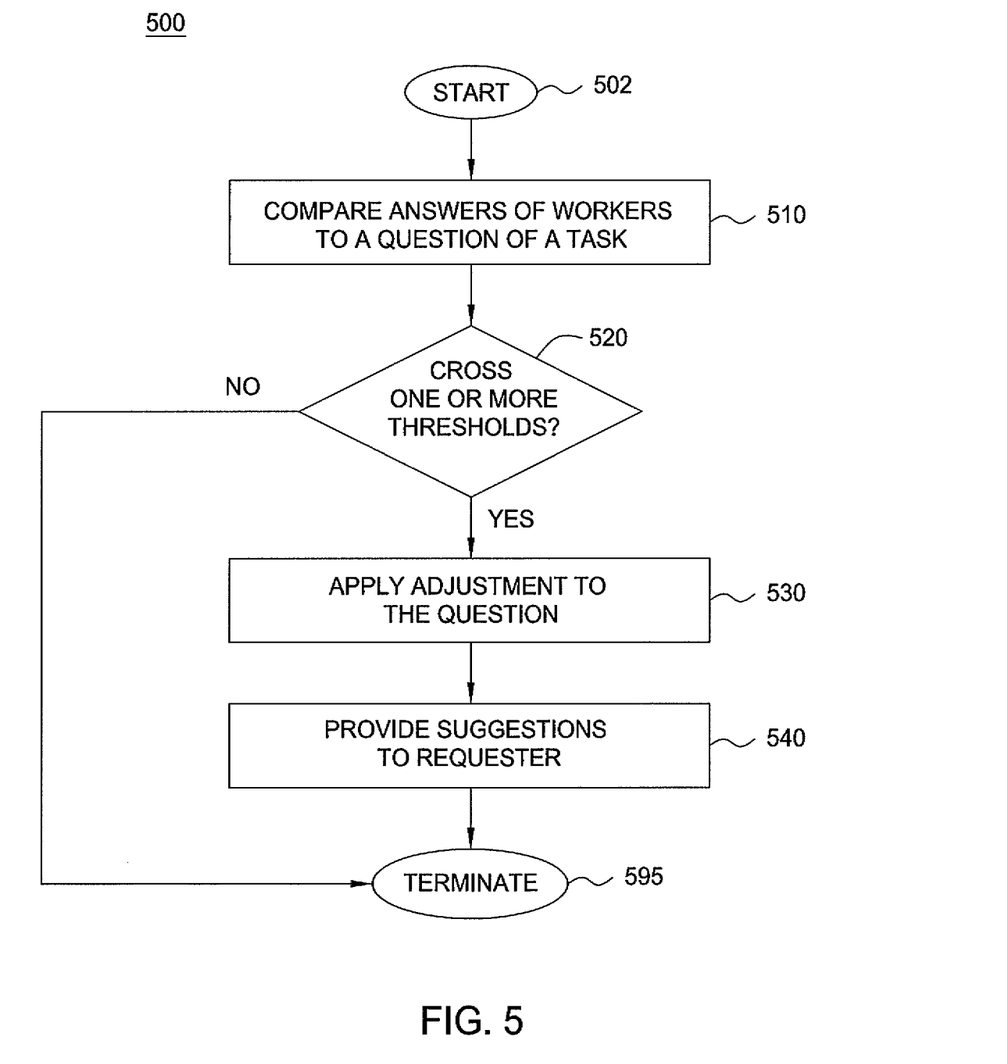
FIG. 5 illustrates a more detailed flowchart of a method for applying a task to a crowdsourcing platform for processing including analyzing answers on a per-question basis.

FIG. 5 illustrates a flowchart of a method 500 for performing a question-centric post-analysis on results data obtained from a crowdsourcing system. The steps of the method 500 may comprise, for example, steps 270 and 280 of FIG. 2. In addition, the steps of the method 500 may be performed by any one or more of the components of the system 100 depicted in FIG. 1, including application server 120. Question-centric post-analysis broadly encompasses the analyzing of results data on a per-question basis (i.e., to extract characteristics from the results data that are specific to a particular question and that are indicative of the quality of the question). Examples of characteristics that may be analyzed on an per-question basis are described below in connection with the exemplary method 500.

The method 500 begins in step 502 and proceeds to step 510. At step 510, the method 500 selects a question that is part of a completed task for analysis. It is assumed that the method 500 has previously received a set of results data from a crowdsourcing platform. An example of receiving the results data is described above in connection with step 260 in FIG. 2. After receiving the results data, the method 500 may compare the answers of all workers answering the question to one another in order to determine various metrics.

For example, as described above, the estimated accuracy of answers to a question may be determined by an entropy measure which indicates how well correlated the answers to a particular question are. For example, if 85 out of 100 workers provide the same answer to a question, the answers may be considered well-correlated, or substantially homogenous, and the question has a low entropy. On the other hand, if 30 workers provide the same one answer, 20 workers provide the same second answer, 25 workers provide the same third answer, and the rest of the remaining 100 workers provide a range of other answers, the answers may be considered not well-correlated, or substantially non-homogenous, and thus, the question may be considered as having a high entropy. The entropy of a question (e.g., the entropy of the set of answers to the question) may be quantized according to well known algorithms. Accordingly, the entropy of the question is an example of one metric that may be extracted from the results data at step 510.

At step 520, the method 500 determines if one or more question-centric thresholds are crossed. For example, the method 500 may determine whether the entropy of the question has fallen below an predefined entropy threshold. The entropy threshold may be a system parameter, or may be a user-specified threshold. For example, the requester, such as a user of operator terminal 180 in FIG. 1, may specify an entropy threshold below which the answers/solutions to a question should be flagged. Accordingly, high entropy questions, which may be indicative of a poorly crafted question, or an overly difficult question, may be set aside for further processing.

In one embodiment, the further processing may comprise the application of one or more adjustments to the question at step 530. For example, the method 500 may discard the results data associated with the question. In another embodiment, the method 500 may apply a weighting factor to the answers associated with the question. For example, the answers to the question may comprise the inputs to a formula or algorithm for determining a composite answer. As an example, a job may comprise the general question of "Do people like our company logo?" However, the requester may not trust the answers of workers who simply answer the question directly. For example, the requester may suspect a general positive bias based upon a typical worker's unconscious desire to be more agreeable when posed with a potentially confrontational question. Thus, the potentially confrontational question, "Do you like our company logo?" may be broken into a series of sub-questions that may be part of one or more tasks comprising the overall job. For example, the following questions may be derived from the above general question: "Do you like the color of the company logo?", "Do you like the mascot on the company logo?", "Do you like the font of the company logo?" and so forth. The entire job may place a weighting on the answers to each of sub-questions to achieve a composite result, e.g., via a computer-implemented formula or algorithm. In a simple example, the job may have three sub-questions and the final result is to be calculated from a composite of the answers to the three sub-questions with the answers weighted equally among the sub-questions (i.e., 33.33% each). However, if one of the questions is determined to have a high entropy (e.g., having crossed an entropy threshold as determined via steps 510 and 520), the weighting factor for the answers to that question may be downgraded by some pre-determined factor, e.g., a 25% weighting instead of 33.33%, in the calculation of the overall result.

Although only one question-centric threshold is described above, it should be noted that numerous additional thresholds may be implemented as an alternative or in addition to those described above. For example, the method 500 may implement an alternative entropy threshold, where the crossing of which results in a weighting factor for the question to be increased.

At step 540, the method 500 may provide suggestions to the requester, such as the user at operator station 180 in FIG. 1. The suggestions may be based on the determination that one or more question-centric thresholds were crossed, as described above in steps 510 and 520. For example, if a high-entropy threshold is crossed, the circumstance may be indicative of a poorly crafted or an overly difficult question. Accordingly, the method 500 may provide the results data as is to the requester, but will flag the question for further investigation by the requester. In addition, the method 500 may provide suggestions to the user, such as an indication that the question may be poorly crafted or overly difficult based on the question-centric analysis. In yet another embodiment, the method 500 may have automatically discarded the results data associated with a question based on a determination that the question crossed a threshold. In this instance, the method 500 may, at step 540, provide an indication to the job requester that results data for the question have been discarded and may provide a reason why the data was discarded.

After the suggestions, if any, are provided at step 540, the method 500 proceeds to step 595 where the method terminates.

Although steps of the exemplary methods 200, 300, 400 and 500 have been described as taking place at, or being performed by an application server, such as application server 120 in FIG. 1, it should be understood that some or all of the steps may take place at, or be performed by, any other component of the system in FIG. 1. In addition, although not specifically specified, one or more steps of methods 200, 300, 400 and 500 may include a storing, displaying and/or outputting step as required for a particular application. In other words, any data, records, fields, and/or intermediate results discussed in the method can be stored, displayed and/or outputted to another device as required for a particular application. Furthermore, steps or blocks in FIGS. 2, 3, 4, and 5 that recite a determining operation or involve a decision do not necessarily require that both branches of the determining operation be practiced. In other words, one of the branches of the determining operation can be deemed as an optional step.

Figure 6:
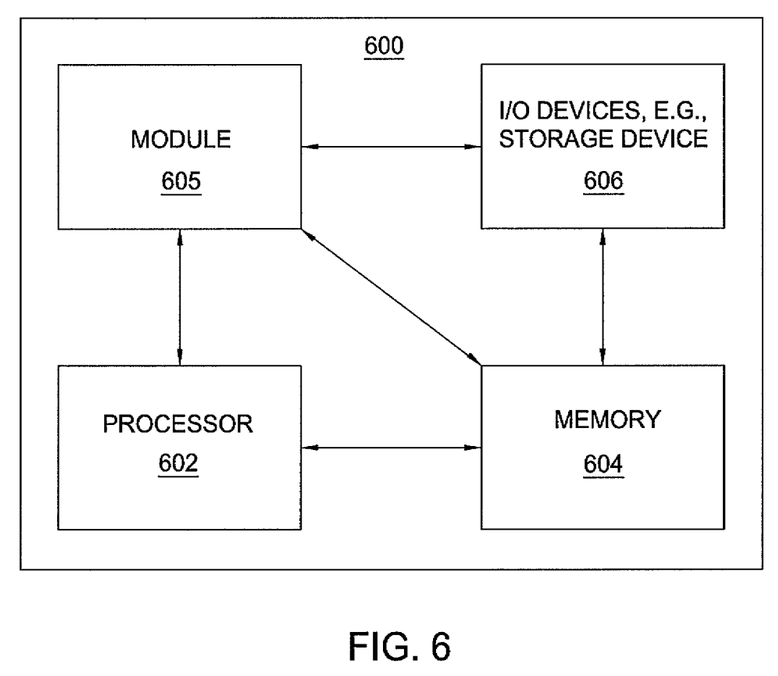
FIG. 6 illustrates a high-level block diagram of a general-purpose computer suitable for use in performing the functions described herein.

FIG. 6 depicts a high-level block diagram of a general-purpose computer suitable for use in performing the functions described herein. As depicted in FIG. 6, the system 600 comprises a processor element 602 (e.g., a CPU), a memory 604, e.g., random access memory (RAM) and/or read only memory (ROM), a module 605 for applying a task to a crowdsourcing platform for processing, and various input/output devices 606 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents. In one embodiment, the present module or process 605 for applying a task to a crowdsourcing platform for processing can be loaded into memory 604 and executed by processor 602 to implement the functions as discussed above. As such, the present module or process 606 for applying a task to a crowdsourcing platform for processing (including associated data structures) of the present disclosure can be stored on a non-transitory computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for applying a task to a crowdsourcing platform for processing, comprising:
    forwarding, with a first computing system, the task having a question to the crowdsourcing platform, the task comprising a human intelligence task associated with an identified compensation per human intelligence task, wherein a correct answer to the question is not pre-identified by the first computing system before the forwarding;
    receiving a plurality of answers to the question, wherein the plurality of answers is provided by a plurality of workers associated with the crowdsourcing platform;
    analyzing, with the first computing system, the plurality of answers on a per-worker basis to identify one or more indications of accuracy of one or more answers of the plurality of answers and to determine an adjustment at least partially based on the one or more indications of accuracy of one or more answers of the plurality of answers, wherein the analyzing comprises determining one or more relations of one or more answers of the plurality of answers to one or more subsets of answers of the plurality of answers, wherein the adjustment is based at least in part on the one or more relations and an entropy characterization of the plurality of answers; and
    applying the adjustment to one or more of the plurality of answers.

2. The method of claim 1, wherein the adjustment comprises discarding an answer from the plurality of answers for a particular worker of the plurality of workers.

3. The method of claim 1, wherein the adjustment comprises weighting an answer from the plurality of answers for a particular worker of the plurality of workers.

4. The method of claim 1, wherein the analyzing is based on a consensus of an answer of a particular worker as compared to answers of other workers of the plurality of workers.

5. The method of claim 1, further comprising:
modifying a reputation rating of a particular worker of the plurality of workers based on the analyzing.

6. The method of claim 1, further comprising:
applying a payment adjustment to a particular worker of the plurality of workers based on the analyzing.

7. The method of claim 6, wherein the payment adjustment comprises an increased payment to be provided to the particular worker.

8. The method of claim 6, wherein the payment adjustment comprises a decreased payment to be provided to the particular worker.

9. A method for applying a task to a crowdsourcing platform for processing, comprising:
forwarding, with a first computing system, the task having a first question to the crowdsourcing platform, the task comprising a human intelligence task associated with an identified compensation per human intelligence task, wherein a correct answer to the first question is not pre-identified by the first computing system before the forwarding;
receiving a plurality of answers to the first question, wherein the plurality of answers is provided by a plurality of workers associated with the crowdsourcing platform;
analyzing, with the first computing system, the plurality of answers on a per-question basis to identify one or more indications of accuracy of one or more answers of the plurality of answers and to determine an adjustment at least partially based on the one or more indications of accuracy of one or more answers of the plurality of answers, wherein the analyzing comprises determining one or more relations of one or more answers of the plurality of answers to one or more subsets of answers of the plurality of answers, wherein the adjustment is based at least in part on the one or more relations and an entropy characterization of the plurality of answers; and
applying the adjustment to the first question.

10. The method of claim 9, wherein the analyzing comprises:
calculating an entropy for the first question based upon a distribution of the answers to the first question.

11. The method of claim 10, wherein the adjustment comprises:
discarding the first question if the entropy is indicative of a high entropy.

12. The method of claim 9, wherein the adjustment comprises:
modifying a weighting factor associated with the first question.

13. The method of claim 12, wherein the task comprises a plurality of questions including the first question, wherein the task is for calculating a composite solution based on a plurality of answers to the plurality of questions, and wherein each of the plurality of questions has a respective weighting factor in calculating the composite solution.

14. A method for applying a task to a crowdsourcing platform for processing, comprising:
forwarding, with a first computing system, the task having a first question to the crowdsourcing platform, the task comprising a human intelligence task associated with an identified compensation per human intelligence task, wherein a correct answer to the first question is not pre-identified by the first computing system before the forwarding;
receiving a plurality of answers to the first question, wherein the plurality of answers is provided by a plurality of workers associated with the crowdsourcing platform;
analyzing, with the first computing system, the plurality of answers on a per-worker basis to identify one or more indications of accuracy of one or more answers of the plurality of answers and to determine a first adjustment at least partially based on the one or more indications of accuracy of one or more answers of the plurality of answers;
applying the first adjustment to one or more of the plurality of answers;
analyzing the plurality of answers on a per-question basis to determine a second adjustment; and
applying the second adjustment to the first question;
wherein one or both of the first adjustment and the second adjustment are based at least in part on one or more relations of one or more answers of the plurality of answers to one or more subsets of answers of the plurality of answers and an entropy characterization of the plurality of answers.

15. The method of claim 14, wherein the first adjustment comprises discarding an answer from the plurality of answers for a particular worker of the plurality of workers.

16. The method of claim 14, wherein the first adjustment comprises weighting an answer from the plurality of answers for a particular worker of the plurality of workers.

17. The method of claim 14, wherein the analyzing the plurality of answers on the per-worker basis is based on a consensus of an answer of a particular worker as compared to answers of other workers of the plurality of workers.

18. The method of claim 14, further comprising:
modifying a reputation rating of a particular worker of the plurality of workers based on the analyzing.

19. The method of claim 14, further comprising:
applying a payment adjustment to a particular worker of the plurality of workers based on the analyzing the plurality of answers on the per-worker basis.

20. The method of claim 14, wherein the analyzing the plurality of answers on the per-question basis comprises:
calculating an entropy for the first question based upon a distribution of the answers to the first question.

* * * * *